BEST AVAILABLE COPY

DESIGN.

C. D. PLATT.

ELECTRIC SWITCH MEMBER.

APPLICATION FILED APR. 12, 1919.

Reissued July 15, 1919. 14,690.

WITNESS:

INVENTOR

Clarence D. Platt

BY

ATTORNEYS

BEST AVAILABLE COPY

UNITED STATES PATENT OFFICE.

CLARENCE D. PLATT, OF BRIDGEPORT, CONNECTICUT.

DESIGN FOR AN ELECTRIC-SWITCH MEMBER.

14,690. Specification for Reissued Design. Reissued July 15, 1919.

Original No. 51,869, dated March 12, 1918, Serial No. 138,510, filed December 22, 1916, for 3½ years. Application for reissue filed April 12, 1919. Serial No. 289,770. Term of patent 14 years.

*To all whom it may concern:*

Be it known that I, CLARENCE D. PLATT, a citizen of the United States, residing at Bridgeport, Fairfield county, Connecticut, have invented a new, original, and ornamental Design for an Electric-Switch Member, of which the following is a specification, reference being had to the accompanying drawing, illustrative of the same and forming part thereof, in which—

I claim—

Figure 1:
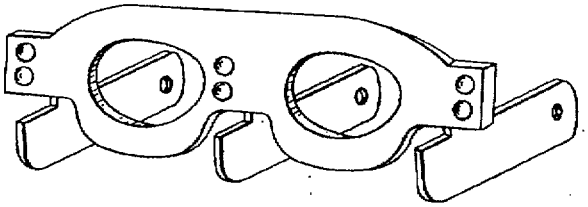
Figure 1 is a perspective view of the switch member embodying my new, original and ornamental design.
Figure 2:
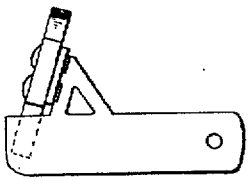
Fig. 2 is a side view of the same.

The design for an electric switch member substantially as shown.

CLARENCE D. PLATT.

Copies of this patent may be obtained for five cents each, by addressing the "Commissioner of Patents, Washington, D. C."